US006629816B2

(12) United States Patent
Langston et al.

(10) Patent No.: US 6,629,816 B2
(45) Date of Patent: Oct. 7, 2003

(54) NON-CONTACTING CLEARANCE SEAL FOR HIGH MISALIGNMENT APPLICATIONS

(75) Inventors: Todd A. Langston, Chandler, AZ (US); William L. Giesler, Phoenix, AZ (US)

(73) Assignee: Honeywell International Inc., Morristown, NJ (US)

(*) Notice: Subject to any disclaimer, the term of this patent is extended or adjusted under 35 U.S.C. 154(b) by 54 days.

(21) Appl. No.: 09/932,829

(22) Filed: Aug. 16, 2001

(65) Prior Publication Data

US 2003/0035718 A1 Feb. 20, 2003

(51) Int. Cl.$^7$ ................................................ F01D 11/04
(52) U.S. Cl. ................... 415/111; 415/123; 415/171.1; 415/230; 277/424; 277/352; 277/399
(58) Field of Search ............................... 415/109, 111, 415/112, 123, 175, 171.1, 174.5, 229, 230; 277/345, 346, 350, 352, 399, 400, 424

(56) References Cited

U.S. PATENT DOCUMENTS

| RE17,322 E | 6/1929 | Eveno | |
|---|---|---|---|
| 1,722,129 A | 7/1929 | Eveno | |
| 1,786,104 A | 12/1930 | Baur | |
| 1,797,791 A | 3/1931 | Peyinghaus | |
| 1,905,281 A | 4/1933 | Grandjean | |
| 1,908,739 A | 5/1933 | Eveno | |
| 1,937,741 A | 12/1933 | Bary | |
| 2,036,453 A | 4/1936 | Bary | |
| 2,249,596 A | 7/1941 | Blackmore | |
| 2,593,654 A | 4/1952 | Bouvat-Martin | 308/85 |
| 2,907,595 A | 10/1959 | Benson et al. | 286/10 |
| 3,091,469 A | 5/1963 | Matt | 277/1 |
| 3,799,559 A | 3/1974 | Kayser | 277/41 |
| 4,852,890 A | 8/1989 | Borowski | |
| 4,871,296 A | 10/1989 | Laessle et al. | 415/123 |
| 4,884,945 A | 12/1989 | Boutin et al. | 415/174.2 |
| 4,906,009 A | 3/1990 | Saitoh | 277/68 |
| 4,914,906 A | 4/1990 | Burch | 60/39.142 |
| 4,915,579 A | * | 4/1990 | Whittier et al. | 415/171.1 |
| 4,928,979 A | 5/1990 | Nagasawa | 277/38 |
| 4,962,936 A | 10/1990 | Matsushima | 277/37 |
| 4,962,937 A | 10/1990 | Ashenfelder, Jr. | 277/68 |
| 5,158,304 A | 10/1992 | Orlowski | 277/53 |
| 5,244,216 A | * | 9/1993 | Rhode | 415/174.5 X |
| 5,267,433 A | 12/1993 | Burch | 60/39.142 |
| 5,419,420 A | 5/1995 | Quenneville | 192/103 |
| 5,538,258 A | 7/1996 | Hager et al. | 277/18 |
| 5,558,341 A | * | 9/1996 | McNickle et al. | 277/400 |
| 5,636,848 A | 6/1997 | Hager et al. | 277/18 |
| 5,692,756 A | 12/1997 | Altieri | 277/30 |

FOREIGN PATENT DOCUMENTS

| EP | 1 245 793 | 10/2002 |
|---|---|---|
| GB | 651921 | 4/1951 |
| JP | 59-117957 | 7/1984 |
| WO | 02/25220 | 11/2002 |

* cited by examiner

Primary Examiner—Edward K. Look
Assistant Examiner—Richard A. Edgar
(74) Attorney, Agent, or Firm—Keith A. Newburry, Esq.

(57) ABSTRACT

An improved oil seal is provided for sealing passage of a rotatable shaft through an end wall of a bearing housing in a turbomachine or the like, wherein the shaft is rotatably supported within the bearing housing by oil-lubricated bearings. The improved oil seal comprises a dynamic oil-air separator and a slinger rotor mounted on the shaft for rotation therewith, the slinger rotor having an outwardly extending slinger ring with an outboard seal face with radially oriented slots and a circumferential groove or grooves.

27 Claims, 7 Drawing Sheets

NON-CONTACTING CLEARANCE SEAL FOR HIGH MISALIGNMENT APPLICATIONS

This invention relates generally to improvements in oil seals and related seal systems for preventing oil leakage in connection with rotating shafts, and particularly in connection with relatively high speed rotating shafts in turbomachines and the like. More specifically, this invention relates to an improvement in oil seals utilizing principles of dynamic air-oil separation to seal passage of a rotatable shaft through an end wall of a bearing housing in high misalignment applications.

BACKGROUND OF THE INVENTION

In turbomachinery, a rotatable shaft is commonly supported by appropriate journal and thrust bearings mounted within a bearing housing, wherein oil is circulated from a sump to lubricate the bearings. The rotatable shaft extends through an end wall of the bearing housing, at one or both ends thereof, for appropriate connection to other components of the turbomachine, such as a turbine wheel, compressor wheel, or other suitable shaft drive means or shaft load. Examples of such turbomachines include turbochargers, turbocompressors, gas turbine engines, air turbine starter motors, and the like. Examples of Air Turbine Starters are shown in U.S. Pat. Nos. 4,871,296; 4,914,906; and 5,267,433, incorporated herein by reference.

In general terms, it is highly desirable to minimize and eliminate oil leakage along the rotating shaft and through the end wall of the bearing housing. Alternately stated, it is desirable to confine circulatory oil flow to the interior of the bearing housing. In this regard, a wide variety of oil seal configurations have been proposed in efforts to overcome oil leakage problems. However, the high speed shaft rotation and other operating conditions in a typical turbomachine environment have generally precluded complete elimination of the oil leakage. That is, high speed shaft rotation tends to result in relatively rapid wear of seal structures and early onset of oil leakage. This problem is compounded by high temperature operating environments.

Honeywell International, Inc. is well known as a world leader in aerospace equipment that has non-contacting clearance seals, such as those disclosed in U.S. Pat. Nos. 5,538,258 ("Oil Seal for a High Speed Rotating Shaft;" Hager, J.; Geck, K.; Giesler, W.; Farnsworth, G.) and 5,636,848 ("Oil Seal for a High Speed Rotating Shaft;" Hager, J.; Geck, K.; Giesler, W.; Mathis, D.), incorporated herein by reference. These patents show proven designs that provide a reliable oil to air seal for the output section of an Air Turbine Starter (ATS). These systems incorporate a slinger rotor mounted on the shaft for rotation therewith and located inboard of the end wall of the bearing housing. The slinger rotor and the end wall of the bearing housing are designed to provide at least one and preferably multiple dynamic air-oil separator structures for centrifugal pumping of oil, so as to keep the oil away from the shaft passage in the end wall of the bearing housing.

The clearance seals disclosed in these patents, however, have traditionally been used with ATS systems with sprag clutch output sections. In such applications, the bearing support system provides excellent rotating shaft alignment to the seal housing (stator). In applications with other clutch types, for example pawl & ratchet clutch systems, the bearing support system has a tolerance build-up that can vary the shaft alignment, for example up to 0.3 degrees to the seal housing.

When such shaft misalignment occurs, the gap between the seal rotor and housing opens and closes as the seal rotor rotates through 360° with each rotation. This opening and closing action can produce a negative pumping action that negates the positive pumping action of the dynamic air-oil separator structures of the oil seal, thereby negating the effective operation of the clearance seal.

The clearance seals disclosed in the above-stated patents have thus far not provided adequate sealing of output shafts on air turbine starters using pawl and ratchet clutches. There exists, therefore, a continuing need for further improvements in oil seal structures for use in turbomachines and the like, for substantially eliminating oil leakage through the end wall of a bearing housing, notwithstanding high speed shaft rotation and high temperature operating conditions in high misalignment applications. The present invention fulfills these needs and provides further related advantages. The present invention also provides additional improvements to the dynamic air-oil separator structures used in non-contact clearance seal applications.

SUMMARY OF THE INVENTION

In accordance with the invention, an improved slinger rotor for an improved oil seal is provided for reducing negative pumping action caused by the opening and closing of the gap between the seal rotor and housing as the shaft rotates through 360° in high misalignment applications. The invention is particularly suited for use in association with dynamic air-oil separator structures of an oil seal for substantially eliminating oil leakage along a possibly misaligned rotatable shaft extending through a shaft passage formed in an end wall of a bearing housing in a turbomachine or the like, including, for example, ATS applications with ratchet & pawl clutch assemblies. The invention may also be used with other types of clutch assemblies, e.g., sprag clutch assemblies, and flyweight actuated clutch assemblies such as described in U.S. Pat. No. 5,419,420, incorporated herein by reference. The improved rotor and oil seal includes a slinger rotor mounted within the bearing housing, at the inboard side of the end wall of the bearing housing.

In one embodiment, the slinger rotor has a radially outward extending slinger ring with an outboard seal face which faces the inboard end of the end wall of a bearing housing. The seal face has radially oriented slots and a circumferential groove or grooves. During rotation of the slinger rotor, the radially oriented slots, combined with circumferential grooves, draw oil away from the area in between the seal face of the slinger ring and the inboard side of the end wall of the bearing housing. In this area, the negative pumping action has traditionally saturated the seal and caused leakage in high misalignment applications. The circumferential grooves also reduce air pumping at the face by allowing air to flow circumferentially to match the nutation (or oscillatory movement) of the rotor.

In another aspect of the invention, the slinger rotor defines an internal bore with axially extending lands sized for press-fit mounting onto the rotatable shaft. The lands at the outboard end of the bore are separated by slots which define additional centrifuge surfaces. During shaft rotation, oil and air within these slots is pumped by centrifugal action in a direction away from the end wall. An axial end face on the slinger rotor, opposite the end wall of the bearing housing (i.e., the inboard end), includes radially open notches which function as slinger ports to discharge the pumped oil to the interior of the bearing housing.

Other features and advantages of the present invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE INVENTION

Figure 1:
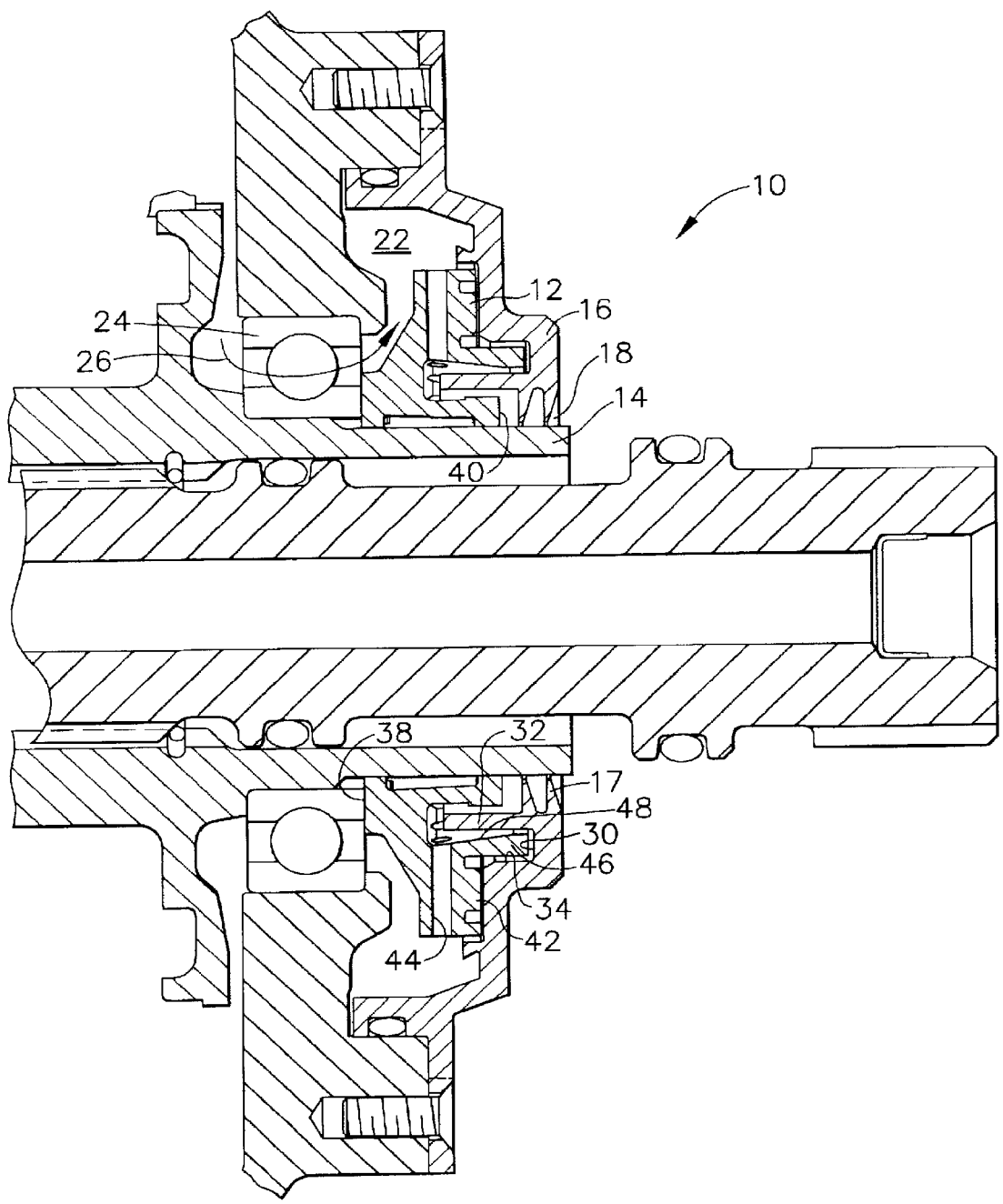
FIG. 1 is a vertical sectional view of a portion of a turbomachine, illustrating an improved oil seal to include a slinger rotor constructed in accordance with the novel features of the invention.

As shown in the exemplary drawings, an improved oil seal arrangement is provided for use in a turbomachine or the like identified generally in FIG. 1 by the reference numeral 10. The oil seal includes a slinger rotor 12, for sealing passage of a rotatable shaft 14 through an end wall 16 of a bearing housing for the turbomachine. The slinger rotor 12 is mounted on the shaft 14 for rotation therewith, and includes one or more dynamic air-oil separators for preventing oil from reaching a shaft passage 18 formed in the housing end wall 16.

FIG. 1 generally shows the rotatable shaft 14 extending through the shaft passage 18 in the end wall 16 of the bearing housing. The end wall 16 cooperates with other elements of the bearing housing to define a substantially enclosed but typically vented space or volume 22 within which the shaft 14 is rotatably supported by appropriate journal and/or thrust bearings 24. An oil circulation system delivers lubricating oil along a flow path 26 to lubricate the bearings 24, wherein the oil flows through the bearings for drainage to a sump (not shown) within a lower region of the bearing housing.

The slinger rotor 12 is mounted on the shaft 14 at the inboard side of the end wall 16, and functions to prevent any oil from reaching the shaft passage 18, thereby substantially eliminating undesired oil leakage. Although the slinger rotor 12 is shown at one end of the bearing housing for purposes of illustrating the invention, it will be understood that a similar oil seal arrangement may be provided in association with another shaft passage at an opposite end of the bearing housing. In this regard, the shaft 14 projects from the bearing housing for appropriate connection to other components of the turbomachine, such as a compressor wheel, turbine wheel, or other drive means or driven load.

To accommodate the seal arrangement, as shown in FIG. 1, the end wall 16 of the bearing housing is shaped to define an annular channel 30 which opens in an inboard direction to the interior 22 of the bearing housing. The channel 30 is defined by an axially projecting cylindrical wall segment 32 which lines the shaft passage 18, and is disposed concentrically within an outer wall segment 34. The inner and outer wall segments 32, 34 are formed coaxially with a rotational axis of the shaft 14.

Figure 2:
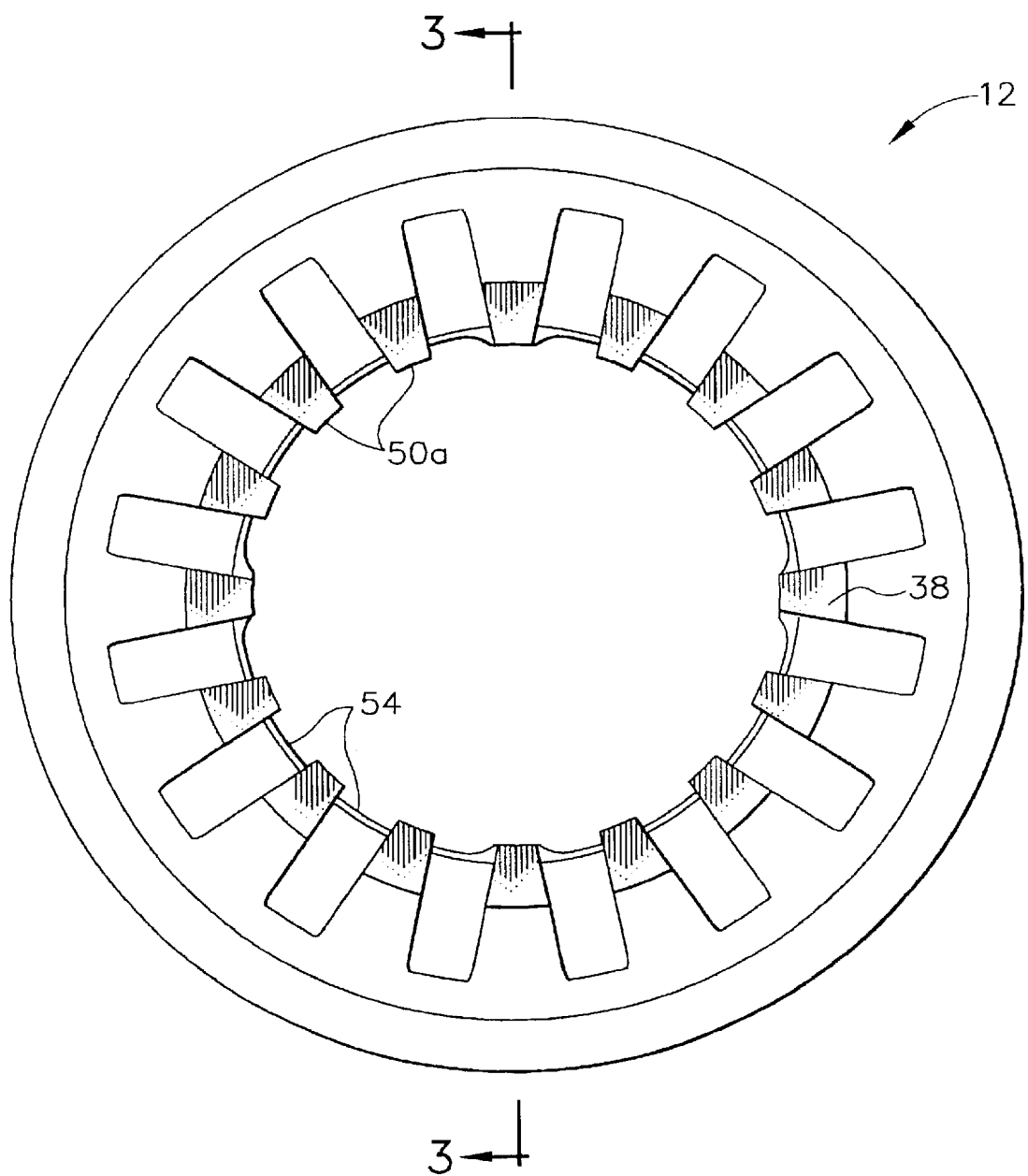
FIG. 2 is an inboard side elevation view of the slinger rotor shown in FIG. 1.
Figure 3:
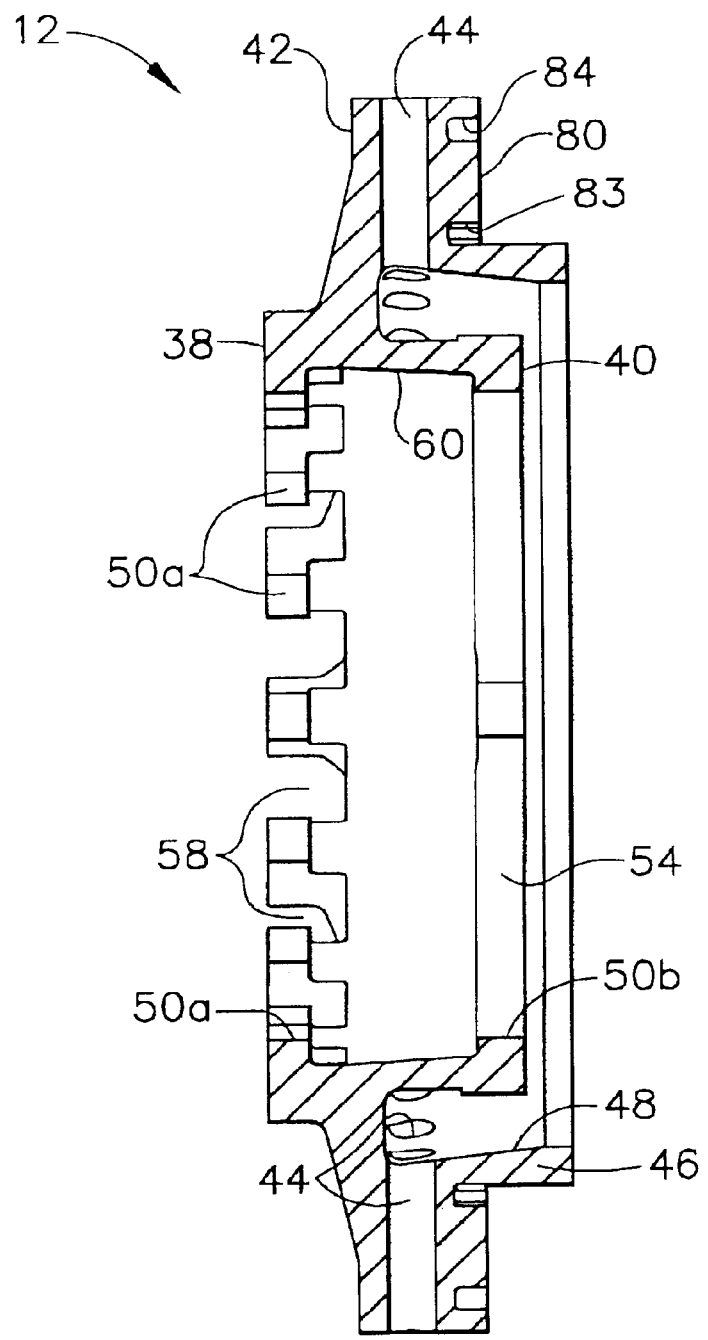
FIG. 3 is a vertical sectional view taken generally on the line 3—3 of FIG. 2.

The slinger rotor 12 has a generally cylindrical configuration with a size and shape for mounting as by press-fit installation onto the rotatable shaft 14. With reference also to FIGS. 2 and 3, the slinger rotor 12 has an inboard axial end face 38 positioned adjacent to, and preferably abutted with the outboard bearing 24 (see FIG. 1) which rotatably supports the shaft 14. An outboard end segment 40 of the slinger rotor 12 is formed with a relatively narrow radial dimension to fit with close running clearance within the inner wall segment 32 of the end wall 16.

A slinger ring 42 is formed on the slinger rotor 12 to extend radially outwardly within the housing interior 22, at a position proximate to the inboard face of the end wall 16. The slinger ring 42 has a circumferentially arranged plurality of radially open slinger ports 44 formed therein. Accordingly, during shaft rotation in the course of turbomachine operation, the slinger ring 42 and associated ports 44 function by centrifugal action to pump oil in a radially outward direction away from the shaft passage 18.

A centrifuge sleeve 46 is also provided as part of the slinger rotor 12 to project axially from the slinger ring 42 in a direction toward the end wall 16, to fit within the end wall channel 30 (see FIG. 1). As shown, the centrifuge sleeve has an inner tapered centrifuge surface 48 positioned in relatively close running clearance with an outer cylindrical surface of the inner wall segment 32. The centrifuge surface 48 is tapered from a relatively small diametric size at the outboard end thereof to a larger diametric size at the radially inner extent of the slinger ports 44. The angle of taper of the centrifuge surface 48 of the centrifuge sleeve is preferably from about 7° to about 10°. In a preferred embodiment of the invention, the angle of taper is about 7°. The slinger ports 44 are in open flow communication with the maximum diameter portion of the centrifuge surface 48.

In operation, during shaft rotation at typically high speed, any oil within the space between the centrifuge sleeve 46 and the inner wall segment 32 is driven or pumped toward the slinger ports 44. In effect, heavier oil is driven by centrifugal action against the centrifuge surface 48 and then axially away from the end wall 16 to the slinger ports 44. As noted previously, oil within the slinger ports 44 is centrifugally pumped for radially outward discharge into the interior 22 of the bearing housing 16, to drain ultimately to the sump.

The above-described centrifugal pumping action may be desirably enhanced by surface finish characteristics of the centrifuge surface 48, and the surface extending radially outward therefrom between the slinger rotor 12 and end wall 16, in comparison with the surface finish on the inner wall segment 32. More particularly, the pumping action is substantially improved by forming the centrifuge surface 48 to be significantly rougher than the surface finish of the outer diameter side of the wall segment 32. With this comparatively rougher surface, the rotating centrifuge sleeve 46 tends to accelerate oil between the sleeve 46 and the adjacent wall segment 32 to a rotational speed substantially corresponding to shaft speed. The thus-accelerated oil and air is then subject to the dynamic air-oil separation, as previously described, with collected oil being ultimately discharged through the slinger ports 44 to the housing interior. Although the comparative surface finishes on the components may vary, a preferred ratio of surface finishes is on the order of about 4:1 or 5:1.

Figure 4:
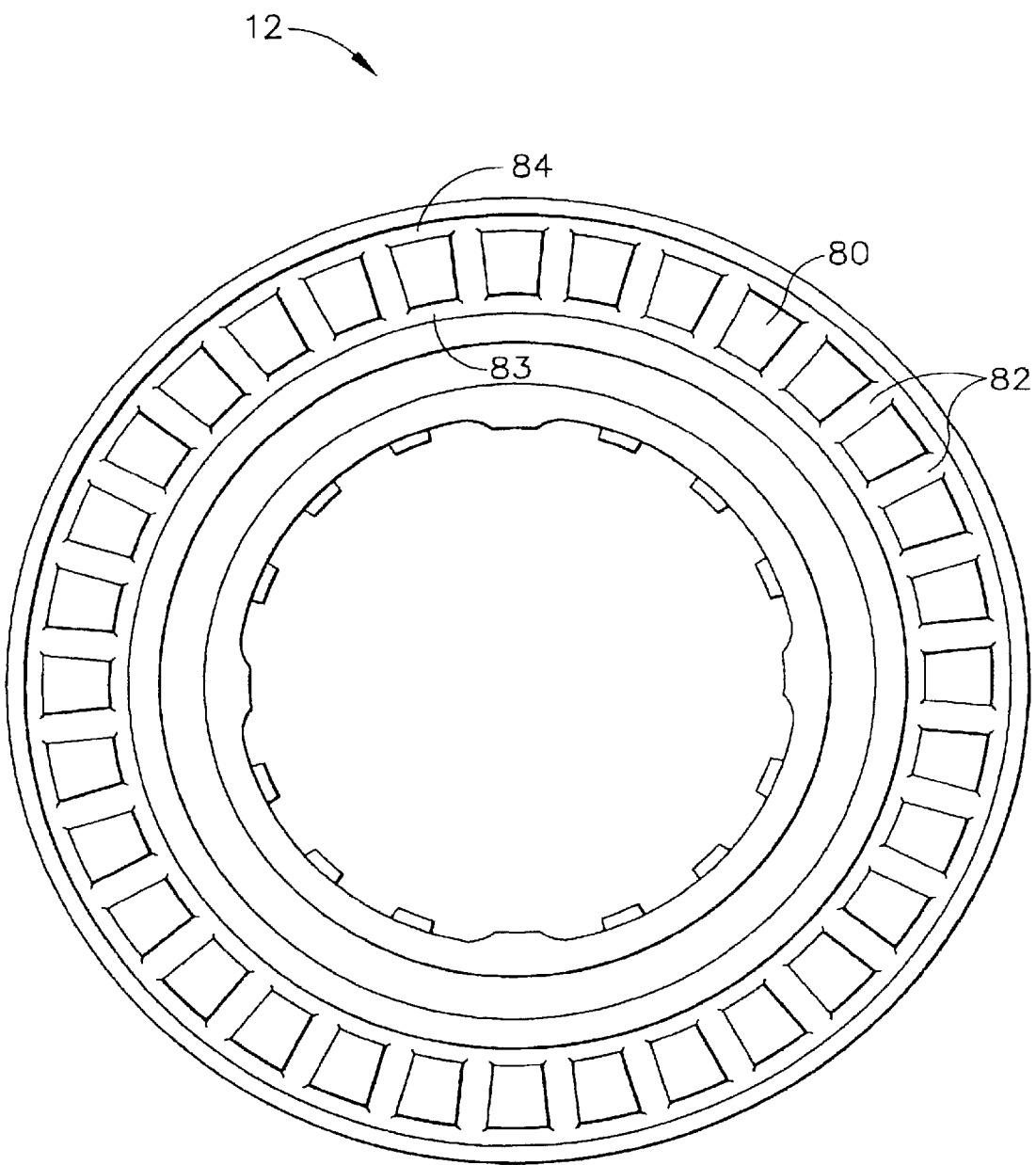
FIG. 4 is an outboard side elevation view of the slinger rotor shown in FIG. 1.
Figure 5:
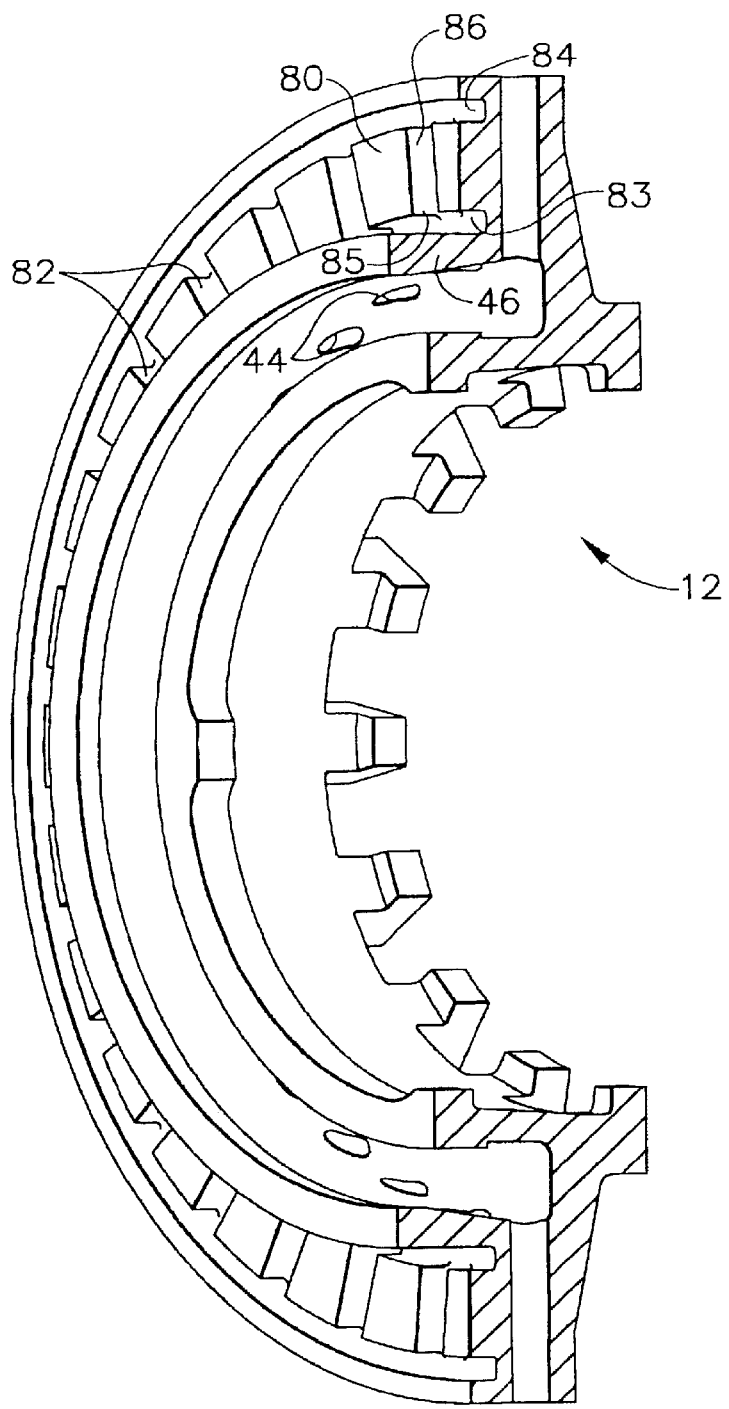
FIG. 5 is a perspective section view of the slinger rotor shown in FIG. 1 taken from the outboard side.

With reference also to FIGS. 4 and 5, an outboard face 80 of the slinger rotor 12 includes radially oriented slots 82 and circumferential grooves 83, 84. During rotation of the slinger rotor, the radially oriented slots 82, combined with circumferential grooves 83, 84, provide a positive pressure differential, which tends to clear out the oil between the seal face 80 of the slinger ring and the inboard side of the end wall of the bearing housing 16, the area where the negative pumping action has traditionally saturated the seal and caused leakage in high misalignment applications. This removal of oil from the aforementioned area tends to prevent the negative pumping action which could otherwise occur where misalignment causes the gap between the seal rotor and housing to open and close as the seal rotor rotates through 360° with each rotation. The circumferential grooves 83, 84 also reduce air pumping at the face by allowing air to flow circumferentially to match the nutation of the rotor. The radially oriented slots have inner ends 85 in contact with the inner circumferential groove 83 and outer ends 86 in contact with the outer circumferential groove 84.

Figure 6:
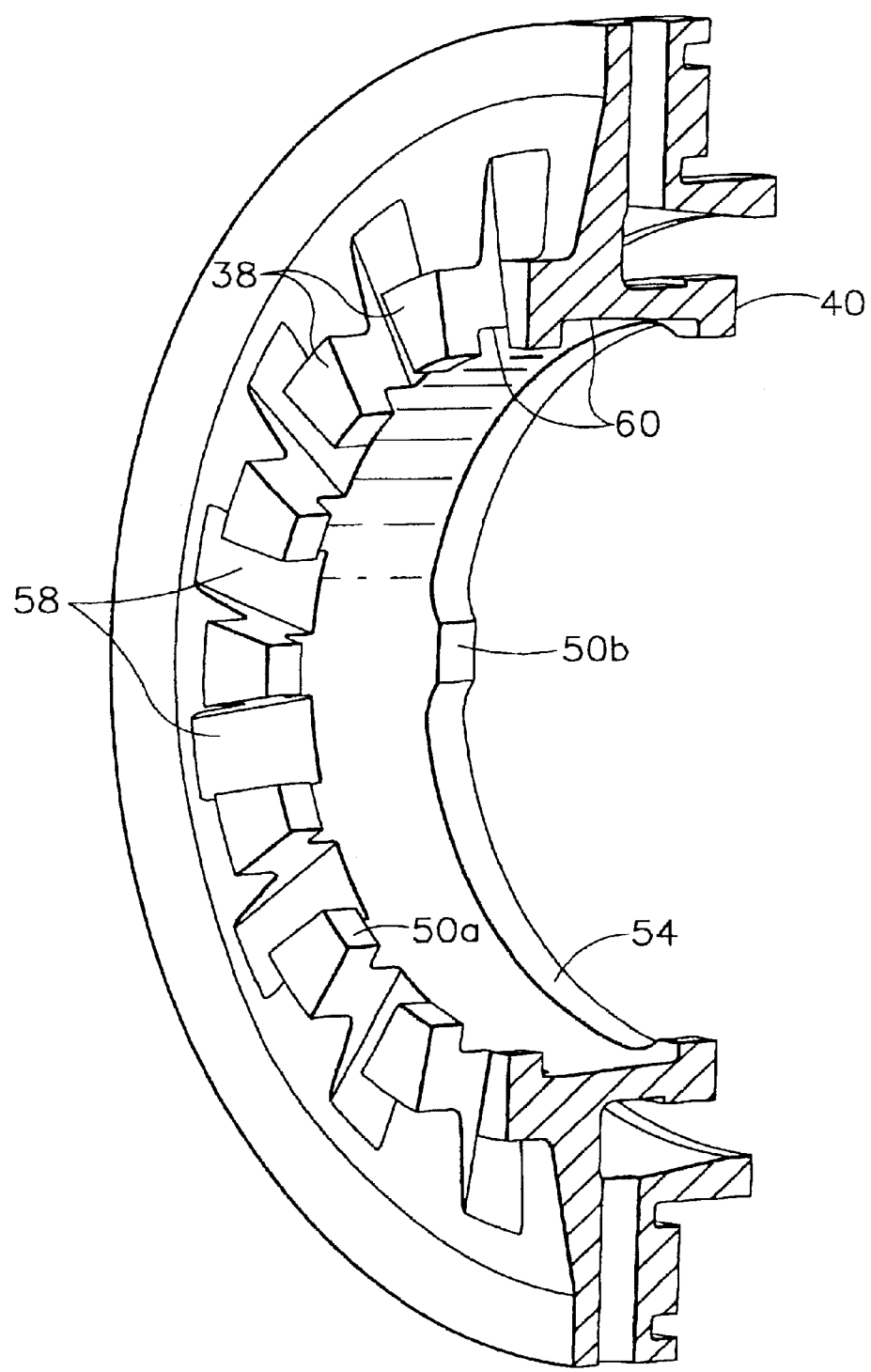
FIG. 6 is a perspective sectional view of the slinger rotor in FIG. 1 taken from the inboard side.

In accordance with further aspects of the invention, an additional dynamic air-oil separator is desirably provided within the internal bore of the slinger ring 42. More specifically, as shown in FIGS. 3 and 6, an annular cavity 60 axially located between the end face 38 and end segment 40 is formed in the inner surface of the slinger ring. The cavity 60 is tapered with increasing diametric size as it extends from the end segment 40 to the end face 38. At the inboard and outboard axial ends of the cavity, are inboard lands 50a and outboard lands 50b of the slinger rotor. The inboard lands 50a are separated circumferentially by corresponding axially extending notches 58 formed in the end face 38 and the outboard lands 50b are separated by corresponding axially extending outboard slots 54. In this embodiment, the outboard slots 54 communicate with the annular cavity 60, and the annular cavity 60 communicates with the axially extending notches 58 formed in the end face 38.

In operation, any oil and air within the annular cavity 60 or the slots 54 of the slinger rotor bore is centrifugally accelerated for depositing the oil onto the tapered centrifuge surfaces at the outermost radial extent of the annular cavity or slots 54. The tapered geometry of these centrifuge surfaces results in centrifugal pumping of the oil toward the axially extending notches 58 of the slinger rotor. These notches 58 act in a manner similar to the slinger ports 44 for radially pumping and discharging the collected oil to the interior 22 of the bearing housing.

The number and circumferential width of the outboard lands are preferably kept to a minimum in order to provide for the maximum flow area through the axially extending outboard slots 54 while retaining sufficient structural integrity of the slinger rotor. In one embodiment, the slots take up over 50% of the circumference of the bore of the slinger ring. In a preferred embodiment, the slinger rotor has sixteen inboard lands 50a and four outboard lands 50b, the four outboard lands being evenly spaced around the circumference of the shaft and each having a circumferential width of about 8°. The angle of taper of the annular cavity 60 and the axially extending slots 54 is preferably between 3° and 5°. In a preferred embodiment, the angle of taper is about 3°.

The axially extending notches 58 are preferably formed as deep into the end face 38 in the outboard axial direction as possible while retaining sufficient structural integrity to bear the rotational loads. In a preferred embodiment, the axially extending notches are formed into the end face 38 to a depth greater than the axial length of the inboard lands 50a and beyond the inboard edge of the cavity 60.

In a further embodiment, a labyrinth knife seal 17 is provided at the shaft passage. In one embodiment, the radial diameter of the shaft at a first labyrinth knife 110 is different from the radial diameter of the shaft at a second labyrinth knife 120, yet the radial clearance between the shaft and the labyrinth knives is essentially the same at each labyrinth knife (see FIG. 7). In another embodiment, the end face of sleeve 46 of the slinger ring extends further outboard than the end segment 40 of the slinger ring (see FIG. 3).

Figure 7:
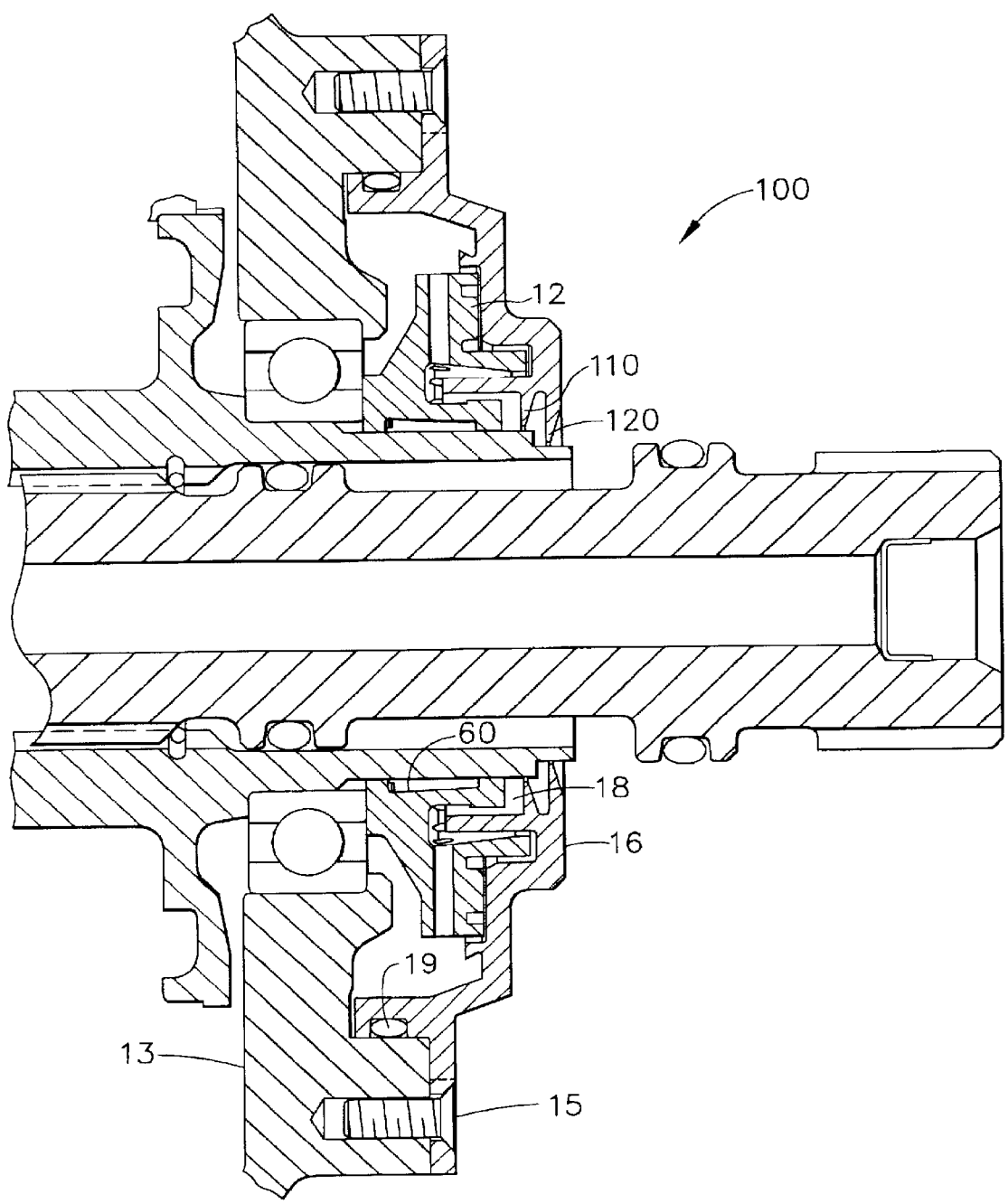
FIG. 7 is a vertical sectional view of a seal according to FIG. 1 for an Air Turbine Starter, wherein the seal includes two knifes at different diameters.

With reference to FIG. 7, a portion of an Air Turbine Starter 100 is shown having a seal stator plate (i.e., end wall 16), a stator housing 13, a fastener 15, an O-ring 19 and the improved slinger rotor 12 of the present invention. These parts may be provided as a spare part kit.

As discussed previously, the rotor tends to clear out the oil in between the seal face of the slinger ring and the inboard side of the end wall of the bearing housing and reduces air pumping at the seal face in applications with at least one and preferably multiple dynamic air-oil separator structures for centrifugal pumping of oil, so as to keep the oil away from the shaft passage 18 in the end wall 16 of the bearing housing. The improved slinger rotor 12 also improves the performance of the dynamic air-oil separator structures by increasing the flow area into the annular cavity 60, by increasing the flow area through the slots 54 (see FIG. 3) and by using the dynamic air-oil separator structures in combination with two labyrinth knives 110, 120 in close axial proximity to each other with similar clearance tolerances but at two sections of the shaft with differing radial diameters.

Importantly, the slinger rotor improves performance in applications in which the bearing support system has a tolerance build-up that can vary the shaft alignment, for example up to 0.3 degrees to the seal housing. Such shaft misalignment causes the gap between the seal rotor and housing to open and close as the seal rotor rotates through 360° with each rotation and would otherwise produce a negative pumping action that negates the positive pumping action of the dynamic air-oil separator structures of the oil seal, thereby negating the effective operation of the clearance seal. The radially oriented slots combined with circumferential grooves provide a positive differential pressure, which tends to clear out the oil in the area between the seal face of the slinger ring and the inboard side of the end wall of the bearing housing, the area where the negative pumping action has traditionally saturated the seal and caused leakage in high misalignment applications. The circumferential grooves also reduce air pumping at the face by allowing air to flow circumferentially to match the nutation of the rotor. Depending on the particular geometry involved in a particular application, an effective seal may be provided for misalignment applications where a misalignment of greater than 0.3 degrees is expected.

A variety of further modifications and improvements to the invention described herein will be apparent to those skilled in the art. Accordingly, no limitation on the invention is intended by way of the foregoing description and accompanying drawings, except as set forth in the appended claims.

What is claimed is:

1. An air turbine starter comprising:
   a bearing housing;
   a rotatable shaft through a shaft passage formed in an end wall of the bearing housing; and a slinger rotor mounted on said shaft for rotation therewith, the slinger rotor including a slinger ring having an outboard seal face with a circumferential groove and a radially oriented slot.

2. The air turbine starter of claim 1, further comprising a pawl and ratchet clutch assembly in the bearing housing.

3. The air turbine starter of claim 1, further comprising a sprag clutch assembly in the bearing housing.

4. The air turbine starter of claim 1, further comprising a flyweight actuated clutch assembly in the bearing housing.

5. The air turbine starter of claim 1, further comprising a first labyrinth knife and a second labyrinth knife in close axial proximity to each other, wherein the radial diameter of the shaft at the first labyrinth knife is different than the radial diameter of the shaft at the second labyrinth knife and wherein the radial clearance between the shaft and each knife is substantially the same.

6. The air turbine starter of claim 1, wherein:
the radially oriented slot is in contact with the circumferential groove.

7. The air turbine starter of claim 1, wherein:
the slinger rotor has a centrifuge sleeve projecting in an outboard direction axially from an outboard side of the slinger ring, the centrifuge sleeve having an internal centrifuge surface with a diametric size which tapers with increasing diameter in an inboard direction,
the slinger ring has a plurality of radially open slinger ports formed therein, the radially open slinger ports having radially inner ends, and
the internal centrifuge surface has an inboard end in flow communication with the radially inner ends of the slinger ports.

8. The air turbine starter of claim 1, wherein:
the slinger rotor has a bore formed therein defined by a plurality of axially extending lands separated from each other by axially extending slots having a diametric size which tapers with increasing diameter in an inboard direction, said lands being sized for press-fit mounting of said slinger rotor onto a shaft, and said slots being for pumping oil within the space between adjacent lands by centrifuge action in an inboard direction during rotation.

9. The air turbine starter of claim 8, wherein:
the slots are in communication with radially open notches formed in an inboard end face of the slinger rotor.

10. The air turbine starter of claim 1, wherein:
the slinger rotor has a bore formed therein,
the bore of the slinger rotor is defined by a plurality of axially extending inboard lands at an inboard end face of the slinger rotor and a plurality of axially extending outboard lands at an outboard end segment of the slinger rotor,
the inboard lands being separated by axially extending notches and the outboard lands being separated by outboard slots.

11. The air turbine starter of claim 10, wherein:
the outboard slots each having a diametric size which tapers with increasing diameter in an inboard direction.

12. The air turbine starter of claim 10, wherein the bore is further defined by an annular cavity located between the outboard lands and the inboard lands, the cavity is tapered with increasing diametric size in an inboard direction and the annular cavity communicates with the outboard slots and axially extending notches.

13. The air turbine starter of claim 12, wherein the axially extending notches are cut axially into the inboard end face of the slinger rotor and into the annular cavity such that the annular cavity is in direct communication with the notches.

14. The air turbine starter of claim 1, further comprising:
a generally cylindrical wall segment formed on an end wall of the bearing housing in a position lining the shaft passage and projecting from the end wall in an axially inboard direction into the bearing housing, said cylindrical wall segment having an inner wall segment on the end wall that cooperates with an outer generally cylindrical wall segment on the end wall to define an annular channel;
the slinger ring including a plurality of radially open slinger ports formed therein;
said slinger rotor further including a centrifuge sleeve extending axially from said slinger ring in an outboard direction and projecting axially into said annular channel, said centrifuge sleeve defining an internal centrifuge surface disposed in relatively close running clearance with said cylindrical wall segment and having a diametric size which tapers with increasing diameter in an inboard direction, said centrifuge surface having an inboard end in flow communication with radially inner ends of said slinger ports, whereby oil within the space between said centrifuge sleeve and said cylindrical wall segment is pumped by centrifuge action during shaft rotation along said centrifuge surface in a direction away from the end wall to said slinger ports.

15. The air turbine starter of claim 14, wherein:
the slinger rotor has a bore formed therein;
the bore of the slinger rotor is defined by a plurality of axially extending inboard lands at an inboard end face of the slinger rotor and a plurality of axially extending outboard lands at an outboard end segment of the slinger rotor, and
the inboard lands being separated by axially extending notches and the outboard lands being separated by outboard slots.

16. The air turbine starter of claim 15, wherein:
an annular cavity is disposed between the axially extending notches and the outboard lands, the annular cavity being tapered with increasing diametric size as it extends from the outboard slots to the axially extending notches.

17. The air turbine starter of claim 16, wherein:
the outboard slots each having a diametric size which tapers with increasing diameter in an inboard direction.

18. The air turbine starter of claim 16, wherein:
the axially extending notches are cut axially into the inboard end face of the slinger rotor and into the annular cavity such that the annular cavity is in direct communication with the notches.

19. The air turbine starter of claim 16, wherein:
the number of inboard lands is greater than the number of outboard lands and the circumferential width of the axially extending notches is less than the circumferential width of the outboard slots.

20. The air turbine starter of claim 16, wherein:
the outboard slots are in communication with the annular cavity and the annular cavity is in communication with the axially extending notches.

21. The air turbine starter of claim 20, wherein the slots take up greater than 50% of the circumference of the bore of the slinger rotor.

22. An air turbine starter comprising:

a bearing housing;

a rotatable shaft through a shaft passage formed in an end wall of the bearing housing;

a slinger rotor mounted on said shaft for rotation therewith, the slinger rotor including a slinger ring having an outboard seal face with a circumferential groove and a radially oriented slot; and wherein the circumferential groove is an inner circumferential groove, and further comprising an outer circumferential groove in the seal face and the radially oriented slot is one of a plurality of radially oriented slots with inner ends and outer ends, the inner ends being in contact with the inner circumferential groove and outer ends being in contact with the outer circumferential groove.

23. The air turbine starter of claim 22, further comprising a generally cylindrical wall segment formed on the end wall in a position lining the shaft passage and projecting from the end wall in an axial inboard direction into the bearing housing said cylindrical wall segment having an inner wall segment on the end wall that cooperates with an outer generally cylindrical wall segment on the end wall to define an annular channel;

said slinger ring having a plurality of radially open slinger ports formed therein;

said slinger rotor further including a centrifuge sleeve extending axially from said slinger ring in an outboard direction and projecting axially into said annular channel, said centrifuge sleeve defining an internal centrifuge surface disposed in relatively close running clearance with said cylindrical wall segment and having a diametric size which tapers with increasing diameter in an inboard direction, said centrifuge surface having an inboard end in flow communication with radially inner ends of said slinger ports, whereby oil within the space between said centrifuge sleeve and said cylindrical wall segment is pumped by centrifuge action during shaft rotation along said centrifuge surface in a direction away from the end wall to said slinger ports.

24. An air turbine starter comprising:

a bearing housing;

a rotatable shaft through a shaft passage formed in an end wall of the bearing housing;

a slinger rotor mounted on said shaft for rotation therewith, the slinger rotor including a slinger ring having an outboard seal face with a circumferential groove and a radially oriented slot; and wherein the circumferential groove is an inner circumferential groove, and further comprising an outer circumferential groove in the seal face and the radially oriented slot is one of a plurality of radially oriented slots with inner ends and outer ends, the inner ends being in contact with the inner circumferential groove and outer ends being in contact with the outer circumferential groove;

wherein the slinger rotor has a bore formed therein, the bore of the slinger rotor is defined by a plurality of axially extending inboard lands at an inboard end face of the slinger rotor and a plurality of axially extending outboard lands at an outboard end segment of the slinger rotor, the inboard lands being separated by axially extending notches and the outboard lands being separated by outboard slots;

wherein the outboard slots each having a diametric size which tapers with increasing diameter in an inboard direction;

wherein the bore is further defined by an annular cavity located between the outboard lands and the inboard lands, the cavity is tapered with increasing diametric size in an inboard direction and the annular cavity communicates with the outboard slots and axially extending notches; and wherein the axially extending notches are cut axially into the inboard end face of the slinger rotor and into the annular cavity such that the annular cavity is in direct communication with the notches.

25. A kit for installing a non-contacting clearance seal for high misalignment applications to a housing of an air turbine starter, the kit comprising:

a seal stator plate to form an end wall of the housing, thee seal stator plate including a generally cylindrical wall segment projecting in a axially inboard direction into the housing, said cylindrical wall segment having an inner wall segment that cooperates with an outer generally cylindrical wall segment to define an annular channel;

an oil seal rotor including a slinger ring with a plurality of radially open slinger ports formed therein;

said oil seal rotor further including a centrifuge sleeve extending axially from said slinger ring in an outboard direction and projecting axially into said annular channel, said centrifuge sleeve defining an internal centrifuge surface disposed in relatively close running clearance with said cylindrical wall segment and having a diametric size which tapers with increasing diameter in an inboard direction, said centrifuge surface having an inboard end in flow communication with radially inner ends of said slinger ports, whereby oil within the space between said centrifuge sleeve and said cylindrical wall segment is pumped by centrifuge action during shaft rotation along said centrifuge surface in a direction away from the end wall to said slinger ports, and the slinger ring having an outboard seal face with a circumferential groove and a radially oriented slot;

an O-ring for statically sealing the stator plate to the housing;

the oil seal rotor sized to press fit mount on an existing or modified shaft diameter.

26. The kit of claim 25 further including fasteners for mounting the seal stator plate to the housing of the air turbine starter.

27. The air turbine starter of claim 25, wherein the circumferential groove is an inner circumferential groove, and further comprising an outer circumferential groove in the seal face and the radially oriented slot is one of a plurality of radially oriented slots with inner ends and outer ends, the inner ends being in contact with the inner circumferential groove and outer ends being in contact with the outer circumferential groove.

* * * * *